UNITED STATES PATENT OFFICE.

ARTHUR LÜTTRINGHAUS AND ERNST SCHWARZ, OF MANNHEIM, GERMANY, ASSIGNORS TO BADISCHE ANILIN & SODA FABRIK, OF LUDWIGSHAFEN-ON-THE-RHINE, GERMANY, A CORPORATION OF GERMANY.

YELLOW VAT DYE.

1,044,674.   Specification of Letters Patent.   Patented Nov. 19, 1912.

No Drawing.   Application filed November 3, 1911. Serial No. 658,423.

*To all whom it may concern:*

Be it known that we, ARTHUR LÜTTRINGHAUS and ERNST SCHWARZ, subjects of the King of Prussia, residing at Mannheim, Germany, have invented new and useful Improvements in Yellow Vat Dye, of which the following is a specification.

Our invention relates to a new coloring matter which we regard as a dihalogenated anthraquinone-thioxanthone of a constitution corresponding to the formula

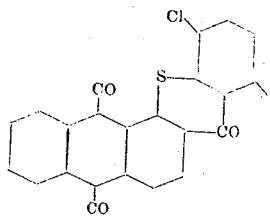

We can prepare our new coloring matter by first treating 1-chloranthraquinone-2-carboxylic acid with 2.5-dichlor-thiophenol and then treating the product with a condensing agent such, for instance, as concentrated sulfuric acid, until a thioxanthone ring is formed.

Our new coloring matter consists, when dry, of a yellow powder and, in the pure state, has a percentage composition corresponding to the formula above. It yields a brilliant blue-red solution in concentrated sulfuric acid, a violet vat in alkaline hydrosulfite solution, and dyes cotton from this vat yellow shades of excellent fastness against the action of chlorin and light.

In this invention, bromin is equivalent to chlorin.

The following example will serve to illustrate further the nature of our invention, which, however, is not confined to this example. The parts are by weight.

Boil together, for about 15 hours, in a reflux apparatus, 240 parts of 1-chlor-anthraquinone-2-carboxylic acid, 150 parts of 2.5-dichlor-1-thiophenol, 40 parts of caustic soda, 50 parts of caustic potash, and 600 parts of water. Then filter and acidify the filtrate with dilute acetic acid, filter off the dichlorbenzene-thio 1-anthraquinone-2-carboxylic acid and wash and dry it. The acid thus obtained is a yellow powder which yields a reddish yellow solution in caustic alkali and in alkali carbonate, and a dull reddish brown solution in cold concentrated sulfuric acid. Heat together, on the water bath, 10 parts of the product thus obtained, and 100 parts of concentrated sulfuric acid, whereupon the color of the solution changes from dull red-brown to brilliant blue-red. When a test portion, on being diluted with water, is practically insoluble in excess of caustic soda solution, pour the reaction mixture into water, filter off the coloring matter and wash it with water and with boiling dilute sodium carbonate solution. It consists of a yellow powder which yields a violet vat and dyes cotton yellow shades of excellent fastness against the action of chlorin, light and washing. The 2.5-dichlor-thiophenol employed in this example can be obtained by treating para-dichlorbenzene with chlorsulfonic acid and reducing the product with zinc dust.

Now what we claim is:—

1. The vat coloring matter which possesses a percentage composition corresponding to the formula

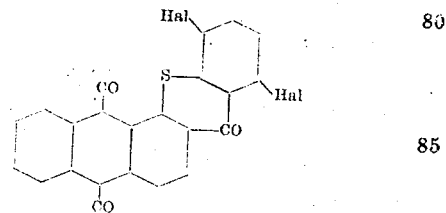

where Hal represents halogen, which coloring matter consists, when dry, of a yellow powder, which yields a brilliant blue-red solution in concentrated sulfuric acid, a violet vat in alkaline hydrosulfite solution, and which dyes cotton from this vat yellow shades of excellent fastness against the action of chlorin and light.

2. The vat coloring matter which possesses a percentage composition corresponding to the formula (assuming the chlorinated compound to be shown,)

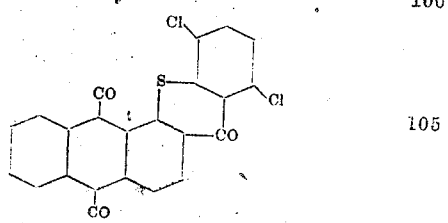

which coloring matter consists, when dry, of a yellow powder, which yields a brilliant blue-red solution in concentrated sulfuric acid, a violet vat in alkaline hydrosulfite solution, and which dyes cotton from this vat yellow shades of excellent fastness against the action of chlorin and light.

In testimony whereof we have hereunto set our hands in the presence of two subscribing witnesses.

ARTHUR LÜTTRINGHAUS.
ERNST SCHWARZ.

Witnesses:
J. ALEC. LLOYD,
JOSEPH PEIFFER.